June 3, 1958 M. MARKS 2,837,599

WAVE-SIGNAL RECEIVERS

Filed March 14, 1955

MEYER MARKS
*INVENTOR.*

BY John J. Pederson

HIS ATTORNEY.

United States Patent Office 2,837,599

Patented June 3, 1958

2,837,599

WAVE-SIGNAL RECEIVERS

Meyer Marks, Clarendon Hills, Ill., assignor to Zenith Radio Corporation, a corporation of Illinois Application March 14, 1955, Serial No. 493,868

5 Claims. (Cl. 179—2.5)

Figure 1:
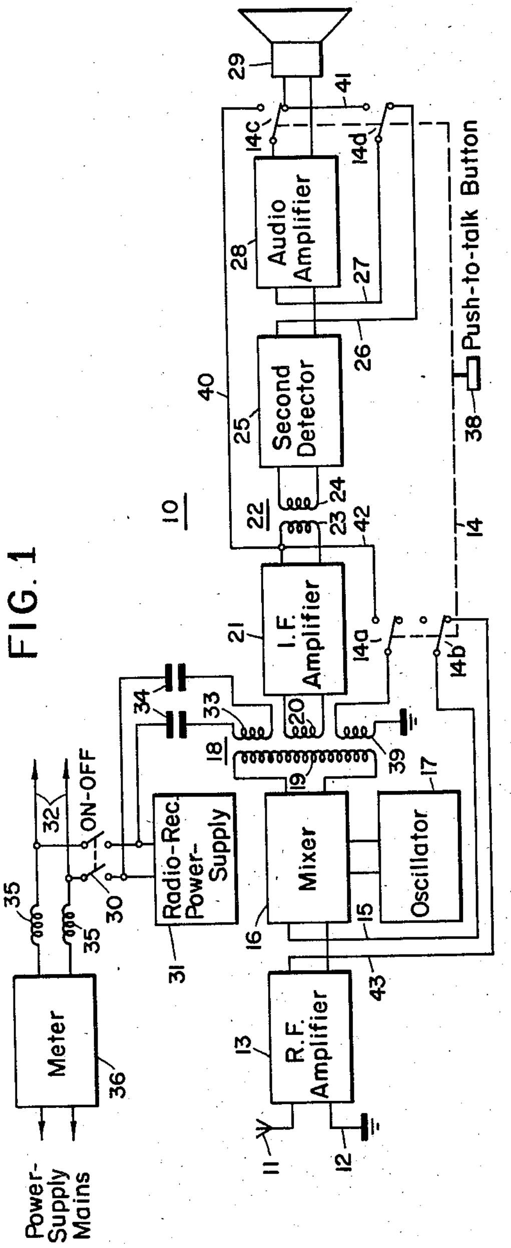

This invention relates to wave-signal receivers, and more particularly to such receivers which may also be utilized to accomplish an auxiliary function.

Intercommunication systems are common today in places of business and even in many homes. To meet the commercial demand for such installations many types of devices have been manufactured and marketed for intercommunication purposes. One common type of system comprises independent stations which are joined for communication purposes by using a common power line connection for the transmission of modulated carrier signals. Each separate station amplifies its audio input, generates a carrier-frequency wave, and impresses the audio signal on the carrier wave; the modulated carrier output is then coupled to the power line. The station, when used as a receiver, has the modulated carrier coupled to it through the power line, amplifies the carrier signal, detects the audio modulation, and translates the resultant wave as an audible output. Because each station in such a network must comprise an audio amplifier, an oscillator (to generate the carrier frequency), a modulator, and a detector, at least three vacuum tubes are normally required; obviously, it would be desirable to accomplish the same results with less equipment.

In the last several decades, the presence of radio receivers in the home has become quite common. Once one radio receiver was a proud possession; today the average home has more than one receiver, distributed about the several floors or in separate rooms such as living room, kitchen and bedroom. If a part of the circuitry normally included in the average radio can be utilized to perform intercommunication functions, such a residence can enjoy an intercommunication system for a cost only slightly greater than that of the radio receiving equipment alone.

It is, therefore, an object of this invention to provide an intercommunication system where two or more radio receivers are normally used without the attendant difficulty and expense of acquiring additional equipment.

It is also an object of this invention to provide a radio receiver with the auxiliary function of operating as a two-way intercommunicating station.

It is another object of the invention to provide such a receiver without adding additional tubes or major components, and by providing only a minimum of switching and related circuitry.

In accordance with the invention, a wave-signal receiver may be used either to receive and reproduce radiated intelligence signals, or as an intercommunication receiver in conjunction with other similar receivers energized from a common power line. Such a receiver includes conventional receiving, detecting, and amplifying stages, and an electromechanical transducer, such as a loudspeaker, for reproducing the received intelligence. A first switch element conditions one of the receiving or amplifying stages to generate local oscillations, and a second switch element enables the loudspeaker to be used as a microphone for developing a local intelligence signal.

A third switch element effects modulation of the local oscillations by the local intelligence signal, and the resulting signal is coupled to the common power line. The switch elements are ganged for unicontrol operation.

Figure 2:
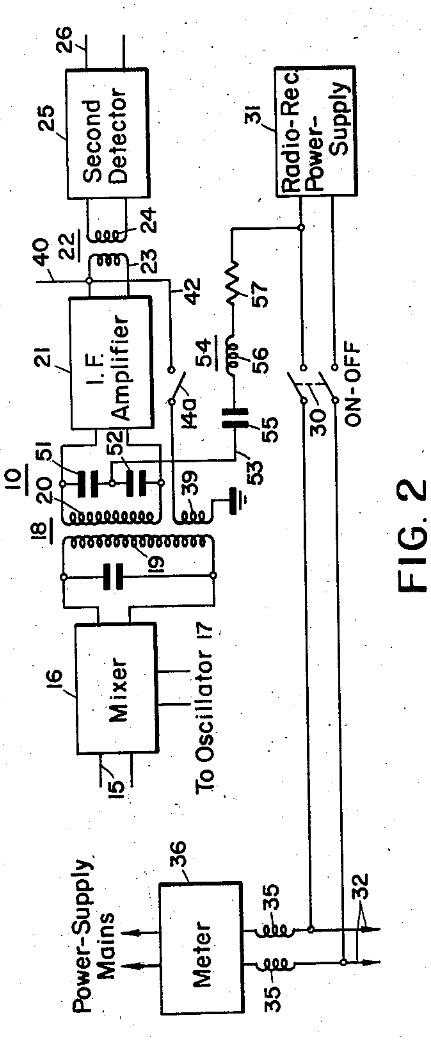

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

Figure 1 is a block diagram, partly in schematic form, of a wave signal receiver embodying the invention; and Figure 2 is a fragmentary block diagram, partly in schematic form, showing another embodiment of the invention.

Figure 1 shows an erstwhile conventional radio receiver 10 which has been modified to incorporate a preferred embodiment of the invention. An antenna 11 and a ground reference connection 12 are connected to the input side of a radio-frequency (R. F.) amplifier 13. The output terminals of R. F. amplifier 13 are connected through a lead 43, a switch segment 14B and a lead 15 to the input terminals of a mixer 16. A local oscillator 17 is also coupled to mixer 16. The output terminals of mixer 16 are connected through a coupling transformer 18, which has a primary winding 19 and a secondary winding 20, to an intermediate-frequency (I. F.) amplifier 21. I. F. amplifier 21 is connected through a coupling transformer 22, which has a primary winding 23 and a secondary winding 24, to the input terminals of a second detector 25. Second detector 25 is connected to a lead 26, which is connected through a switch segment 14D to a lead 27, and thence to the input terminals of an audio amplifier 28. Audio amplifier 28 is coupled through a switch segment 14C to a sound-reproducing device such as a loudspeaker 29.

An on-off switch 30 connects a power supply 31 for the radio receiver to the local power lines 32. On-off switch 30 also connects a winding 33 on the secondary side of coupling transformer 18 through two capacitors 34 to local power lines 32. Capacitors 34 are proportioned to present a high impedance to 60-cycle energy but to present a negligible impedance to signal frequencies corresponding to the intermediate frequency of the receiver. Winding 33, power supply 31, and local power lines 32 are connected through two radio-frequency chokes 35 to a power meter 36; the other side of meter 36 is connected to the public power supply mains. Radio-frequency chokes 35 are proportioned to present a high impedance to energy of the same frequency as the intermediate frequency of receiver 10.

A push-to-talk button 38 is shown connected to switch 14. Switch 14 is shown in its normal position; for purposes of description the alternative position, with the switch blades displaced upwardly, will be referred to as the "intercom" position. Push-to-talk button 38 physically displaces each of the four blades of switch 14 into the upper, or intercom, position; which 14 is shown in Figure 1 in the lower, or normal, position. When switch 14 is in the intercom position, segment 14A connects the output side of I. F. amplifier 21 through a lead 42 to a feedback coil 39, which is magnetically coupled to secondary winding 20 of coupling transformer 18; this connection is broken when switch 14 is returned to its normal position. Segment 14B normally connects leads 43 and 15, thus coupling R. F. amplifier 13 to mixer 16; when switch 14 is displaced to the intercom position, segment 14B disconnects lead 13 from lead 15, and thus disconnects R. F. amplifier 43 from mixer 16. In the normal position of switch 14, segment 14C connects audio amplifier 28 to speaker 29; in the intercom position segment 14C connects the output of audio amplifier 28 through a lead 40 to the high-potential terminal of primary winding 23. Normally segment 14D connects leads 26 and 27 and therefore couples second detector 25 to audio amplifier 28; in the intercom position, segment 14D couples speaker 29 through a lead 41 to lead 27, and thence to the input terminals of audio amplifier 28.

As shown in Figure 1, when switch 14 is in the lower, or normal, position receiver 10 functions as a conventional superheterodyne radio receiver. Radio-frequency energy is coupled from antenna 11 to R. F. amplifier 13, thence through lead 43, segment 14B of switch 14, and lead 15 to the input side of mixer 16; oscillator 17 also couples energy to mixer 16. The desired intermodulation product by mixer 16 is applied through coupling transformer 18, I. F. amplifier 21, and coupling transformer 22 to second detector 25. The output of second detector 25 is connected through lead 26, segment 14D of switch 14, and lead 27 to the input of audio amplifier 28. The output of audio amplifier 28 is coupled through segment 14C to speaker 29, which converts the electrical energy into sound waves. Thus receiver 10 operates in a conventional and well-known manner, when switch 14 is in the normal position and the tunable circuits are positioned to select an incoming radio-frequency signal.

In accordance with the invention, receiver 10 may also be employed as a transmitting station in an intercommunication system, by displacing push-to-talk button 38 so that the contacts of switch 14 are moved to the upper, or intercom, position. Segment 14A of switch 14 then connects the output of I. F. amplifier 21 through lead 42 to feedback coil 39, which couples energy through secondary winding 20 of coupling transformer 18 to the input of I. F. amplifier 21; thus a regenerative feedback path is established, and oscillations build up in the I. F. stage. Segment 14B of switch 14, in the intercom position, breaks the connection between leads 43 and 15, and thus disconnects the output of R. F. amplifier 13 from the input of mixer 16. Segment 14C of switch 14, when moved from the normal to the intercom position, switches the output of audio amplifier 28 from speaker 29 to lead 40 and thence to the plate circuit of I. F. amplifier 21; here the audio-frequency signal is modulated on the regenerative intermediate-frequency carrier signal. This modulation may be effected by conventional shunt feed or by other methods known in the art. Segment 14D of switch 14 disconnects lead 26 from lead 27, thereby breaking the connection between the output of second detector 25 and the input of audio amplifier 28; segment 14B, in the intercom position, connects speaker 29, which may also be used as a microphone, through leads 41 and 27 to the input of audio amplifier 28.

Thus operation of push-to-talk button 38 moves switch blades 14 to the upper, or intercom, position; in this position audio intelligence spoken into the speaker modulates the oscillating I. F. stage, and a portion of this resultant signal is coupled through winding 33 to the power line of the home or other structure in which receiver 10 is employed. Winding 33 is magnetically coupled to the secondary winding 20 of coupling transformer 18, and therefore is always conditioned to function as an output coupling for receiver 10 when used as an intercommunication transmitting station. If switch 14 is returned to the normal position and receiver 10 is tuned to a strong station, the signal developed across coupling transformer 18 does not transfer sufficient energy through winding 33 to the common power lines to interfere with other receivers connected to the same power lines; the signal level at this point is still comparatively low. However, when push-to-talk button 38 displaces switch 14 into the intercom position, the regeneration feedback of I. F. amplifier 21 builds up to a very high level, so that sufficient energy is coupled through winding 33 to provide more than adequate output strength. It is important, therefore, that the output of I. F. amplifier 21 be coupled in a regenerative sense to its input; in Figure 1, two phase shifts of 180°, the first in I. F. amplifier 21 and the second in the coupling of feedback coil 39 and secondary winding 20 of coupling transformer 18, combine to produce a total phase shift of 360° and therefore produce regenerative feedback. The energy in the feedback path must always be phase-shifted by substantially 360°, or an integral multiple thereof.

Choke coils 35, which present a high impedance at 455 kilocysles or whatever the intermediate frequency of receiver 10 might be, may be provided to effectively isolate the intercommunication system from the power lines of adjacent structures. It will be noted that chokes may similarly be inserted in the power cords of any receivers connected to the same power lines as those to which the intercommunication system is coupled, if it is desired to keep this receiver free from intelligence transmitted by the intercommunication stations.

When switch 14 is displaced to the intercom, or upper, position and receiver 10 is used as a transmitting station in an intercommunication system, a modulated carrier signal of the same frequency as the intermediate frequency of receiver 10 is coupled to the power line. If there is a second receiver 10 coupled to the same power line, having its switch 14 in the normal, or lower, position, the modulated carrier wave is coupled through on-off switch 30 and capacitors 34 to secondary winding 33 of coupling transformer 18. After the incoming carrier wave has been amplified in I. F. amplifier 21, it passes through second detector 25, audio amplifier 28 and loudspeaker 29 in the same manner as would any signal of like frequency coupled to the input terminals of I. F. amplifier 21. But to clearly receive the carrier intelligence coupled through the power lines, the tuned circuits of receiver 10 must be detuned from any incoming radio-frequency signal. If receiver 10 is operating with switch 14 in the normal position and is tuned to translate an audible output from a first signal appearing at antenna 11, a second signal of the same intermediate frequency as that of receiver 10 may be coupled through winding 33 and the secondary side of coupling transformer 18 to the input terminals of I. F. amplifier 21. The second signal will also be detected and amplified, and will interfere with the first signal to which receiver 10 is tuned. This is an indication to the listener that the original setting must be altered, if the second signal is to be clearly audible in the output of speaker 29. Therefore it is seen that in the normal position receiver 10 may be used as both a conventional radio receiver and as a receiving station in an intercommunication system; however, the conventional radio-frequency circuits must be tuned to a position where little or no energy is amplified in the radio-frequency circuits to permit effective utilization of the set as an intercommunication receiver. The set is easily detuned to accept intercommunication transmissions, and may then be retuned to the original setting.

Figure 2 shows another embodiment of the invention which differs from that shown in Figure 1 only in the method of coupling the modulated intermediate-frequency energy to and from the power lines. In the secondary circuit of coupling transformer 18, winding 20 is shown as the inductance in a tank circuit which also includes capacitors 51 and 52. That part of the voltage developed across the tank circuit which appears across capacitor 52 is coupled through a lead 53 to a series-resonant circuit 54 comprising a capacitor 55, an inductance 56, and a resistor 57. The other side of series-resonant circuit 54 is connected to the power lines which also supply energy to radio receiver power supply 31.

Capacitor 52 has a capacity approximately ten times that of capacitor 51; therefore, substantially one-eleventh of the voltage developed across the tank circuit appears across capacitor 52. When receiver 10 is used as a transmitting station in an intercommunication system, the modulated intermediate-frequency carrier signal is coupled from capacitor 52 along lead 53 to series-resonant circuit 54. Series circuit 54 is proportioned to resonate at the intermediate frequency of the receiver, with a bandwidth determined by the size of resistor 57. Series circuit 54 offers a high impedance to 60-cycle energy, so that power-frequency hum does not enter the signal circuits of receiver 10. The remainder of the elements shown have been depicted and described in connection with Figure 1.

The capacity ratings of capacitors 51 and 52 depend in part upon the parameters of the associated circuit elements, but effective results may be obtained by making capacitor 52 approximately ten times larger than capacitor 51. For illustrative purposes and in no sense by way of limitation, capacitor 55 may be 50 micro-microfarads, inductance 56 2.5 millihenries, and resistor 57 80 ohms. These constants give a bandwidth of approximately 6 kilocycles; in other words, the output is 3 decibels down at 3 kilocycles either side of the 455-kilocycle center frequency. These constants may of course be altered to accommodate different intermediate frequencies or to provide different bandwidths.

The invention thus enables an ordinary radio receiver, with slight modifications, to function as both a transmitting and a receiving station in an intercommunication system. A permanent connection couples energy between the power lines and the I. F. circuits of hte receiver; energy may be coupled in either direction along this connection. When used as a transmitting station, the I. F. amplifier is caused to oscillate and to build up a high gain by regenerative feedback; the audio voltage developed from a voice input to the speaker modulates this regenerative signal. A part of the modulated I. F. signal is coupled to the power lines and thence to one or more receiving stations in the intercommunication system. With the addition of simple switching circuitry, two or more conventional radio receivers may be modified for auxiliary employment as both transmitters and receivers in an intercommunication system.

While particular embodiments of the invention have been shown and described, it is apparent that modifications and alterations may be made thereto, and it is intended in the appended claims to cover all such modifications and alterations as may fall within the true spirit and scope of the invention.

I claim:

1. A wave-signal receiver for use alternatively to receive and reproduce radiated intelligence signals, or for intercommunication with other similar receivers energized from a common power line, said receiver comprising: means for receiving and amplifying said radiated intelligence signals; means for detecting said amplified intelligence signals; electromechanical means responsive to said detected signals for reproducing said received intelligence signals; means including a first switch element for conditioning said first-mentioned means to generate local oscillations; means including a second switch element for conditioning said electromechanical means to develop a local intelligence signal; means including a third switch element for modulating said local oscillations with said local intelligence signal; said switch elements being ganged for unicontrol operation; and means for impressing said modulated local oscillations on said power line.

2. A wave-signal receiver for use alternatively to receive and reproduce radiated intelligence signals, or for intercommunication with other similar receivers energized from a common power line, said receiver comprising: means for receiving said radiated intelligence signals; means for amplifying said received intelligence signals; means for detecting said amplified intelligence signals; electromechanical means responsive to said detected signals for reproducing said received intelligence signals; means including a first switch element for conditioning said amplifying means to generate local oscillations; means including a second switch element for conditioning said electromechanical means to generate a local intelligence signal; means including a third switch element for modulating said local oscillations with said local intelligence signal; means including a fourth switch element for effectively disabling said receiving means; said switch elements being ganged for unicontrol operation; and means for impressing said modulated local oscillations on said power line.

3. A wave-signal receiver for use alternatively to receive and reproduce radiated intelligence signals, or for intercommunication with other similar receivers energized from a common power line, said receiver comprising: means for receiving said radiated signals; an amplifier; a demodulator; an electromechanical transducer; first switch means operative in a first condition to couple said receiving means to said amplifier and in a second condition to effectively disable said receiving means; second switch means operative in a first condition to couple said amplifier to said demodulator and in a second condition to condition said amplifier to generate local oscillations; third switch means operative in a first condition to couple said demodulator to said transducer and in a second condition to condition said transducer to generate a local intelligence signal and modulate said local oscillations therewith; and means for impressing said modulated local oscillations on said power line when said switch means are maintained in said second conditions.

4. A wave-signal receiver for use alternatively to receive and reproduce radiated intelligence signals, or for intercommunication with other similar receivers energized from a common power line, said receiver comprising: means for receiving said radiated signals; an amplifier; a demodulator; an electromechanical transducer; first switch means normally coupling said receiving means to said amplifier and operative to effectively disable said receiving means; second switch means normally coupling said amplifier to said demodulator and operative to condition said amplifier to generate local oscillations; third switch means normally coupling said demodulator to said transducer and operative to condition said transducer to generate a local intelligence signal and modulate said local oscillations therewith; and means for impressing said modulated local oscillations on said power line when said switch means are operated.

5. A wave-signal receiver for use alternatively to receive and reproduce radiated intelligence signals, or for intercommunication with other similar receivers energized from a common power line, said receiver comprising: means for receiving said radiated signals; an amplifier; a demodulator; an electromechanical transducer; first switch means operative in a first condition to couple said receiving means to said amplifier and in a second condition to effectively disable said receiving means; second switch means operative in a first condition to couple said amplifier to said demodulator and in a second condition to condition said amplifier to generate local oscillations; third switch means operative in a first condition to couple said demodulator to said transducer and in a second condition to condition said transducer to generate a local intelligence signal and modulate said local oscillations therewith; means for coupling a modulated carrier signal from said common power line to said amplifier when said switch means are maintained in said first conditions and for impressing said modulated local oscillations on said power line when said switch means are maintained in said second conditions.

References Cited in the file of this patent

UNITED STATES PATENTS

| | | |
|---|---|---|
| 2,114,718 | Levy | Apr. 19, 1938 |
| 2,164,960 | Stockton | July 4, 1939 |
| 2,632,812 | Cooney | Mar. 24, 1953 |